United States Patent Office 3,644,412
Patented Feb. 22, 1972

---

3,644,412
PROCESS FOR THE PRODUCTION OF N-CARBOXY ANHYDRIDES AND AMINO ACIDS AND DERIVATIVES THEREOF
Yasuo Fujimoto and Masayuki Teranishi, Machida-shi, Japan, assignors to Kyowa Hakko Kogyo Co., Ltd., Tokyo, Japan
No Drawing. Filed Aug. 23, 1968, Ser. No. 754,999
Claims priority, application Japan, Aug. 23, 1967, 42/53,745
Int. Cl. C07d *85/34*
U.S. Cl. 260—307 B    6 Claims

ABSTRACT OF THE DISCLOSURE

A process for the preparation of N-carboxy anhydrides of amino acids having the general formula:

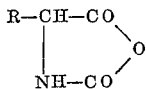

which comprises reacting an amino acid or the salts thereof with phosgene in the presence of an organic triester of phosphoric acid. Preferably, the reaction is carried out with heating in an organic solvent.

---

The present invention relates to a process for producing N-carboxy anhydrides of amino acids or derivatives thereof. More particularly, this invention relates to N-carboxy anhydrides of amino acids having the following general formula:

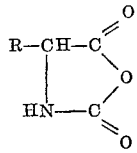

wherein R is an organic residue. Even more particularly, the invention relates to the production of N-carboxy anhydrides of amino acids which comprises reacting amino acids or derivatives thereof having the general formula:

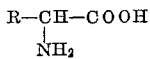

wherein R has the same meaning as defined hereinabove, or the salts thereof (all of which will hereinafter be referred to as amino acids for the sake of simplicity) with phosgene in the presence of organic triesters of phosphoric acid. In the following description, N-carboxy anhydrides of amino acids will be referred to as A-NCA and N-carboxy anhydrides will be referred to as NCA.

As is well known in the art, NCA derivatives of amino acids readily release carbon dioxide by the action of appropriate initiators (for example, organic bases such as diethylamine, triethylamine and the like) in suitable solvents (for example, halogenated aliphatic hydrocarbons such as dichloromethane, dichloroethane, trichloroethane, chloroform and the like; esters such as ethyl acetate; ethers such as dioxane; or mixtures of these various solvents) to polymerize as shown in the following reaction scheme:

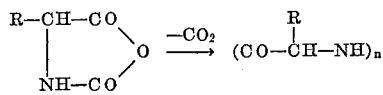

wherein R is as defined above. The resultant polymers (hereinafter termed polyamino acids) are useful materials with a wide range of applications, for example, as synthetic fibers, synthetic leather and the like. The polymers are also model substances of proteins.

It is essential to obtain very highly pure A-NCA derivatives in order to produce polyamino acids having a high degree of polymerization. Side reaction products contained in NCA derivatives, such as isocyanates, carbamyl chlorides and the like of the starting amino acid employed, lower the quality of the resultant polyamino acid. Therefore, complicated methods of purification to remove such impurities have been used in the prior art.

Halogen-containing compounds, in particular, are impurities which constitute a serious drawback in producing polyamino acids having a high degree of polymerization and a high quality [note, for example, J. Am. Chem. Soc., vol. 76, p. 4492 (1954)]. Hence, as a general procedure, A-NCA is usually recrystallised several times before it can be used for polymerization. [Noguchi et al., Seni Kagaku Kenkyusho (Institute of Textile Science), Annual Report No. 17, p. 30 (1964).]

For the synthesis of A-NCA, processes have been known in the prior art wherein amino acids are suspended in inert organic solvents (such as ethers, for example, dioxane, and aromatic hydrocarbons, for example, benzene and toluene) and reacted with phosgene at low temperatures [see, for example, "Synthetic Polypeptides," Academic Press Inc., New York, p. 31 (1956) or J. Chem. Soc., 1950, 3213 (1950)]. And a process as disclosed in Japanese patent publication No. 93/65 and in Japanese patent publication No. 7,382/67 comprises reacting amino acids with phosgene in halogenated hydrocarbons. All of these processes have the drawback that the yield of product is low and/or the product A-NCA is colored or contains a high percentage of halogen-containing impurities. A further disadvantage is that a prolonged reaction time is required.

Noting the fact that, in the synthesis of A-NCA according to the reaction mentioned above, hydrogen chloride is given off by the reaction between the amino group of the amino acid and the phosgene, the present inventors have conducted various studies for determining an appropriate solvent and reaction conditions which would facilitate the release of hydrogen chloride and which would also control side reactions resulting from reactions between A-NCA intermediates and phosgene. Thus, a feasible industrial scale process has been achieved by means of the present invention.

Accordingly, one of the objects of the present invention is to provide an improved process for the production of N-carboxy anhydrides of amino acids and their derivatives which overcomes the disadvantages and deficiencies of the prior art methods.

Another object of the present invention is to provide a process for producing N-carboxy anhydrides of amino acids which may be carried out in an industrially efficacious manner.

A further object of the invention is to provide a process for producing A-NCA derivatives which may be carried out advantageously on an industrial scale to give a high yield of product.

A still further object of the invention is to provide highly pure N-carboxy anhydrides of amino acids or derivatives thereof.

In short, it is the over-riding object of the present invention to eliminate the disadvantages of the prior art and to provide highly pure A-NCA compounds selectively and in good yield by means of a process which can be carried out economically in a short time.

These and other objects and advantages of the present invention will become apparent to those skilled in the art from a consideration of the following specification and claims.

In accordance with the present invention it has been found that organic triesters of phosphoric acid suppress the undesirable side reactions and are effective for facilitating and accelerating the withdrawal of hydrogen chloride from the reaction. The addition of organic phosphoric acid triesters to the reaction solvent (for example, aliphatic or aromatic hydrocarbons) also succeeds in overcoming the drawbacks of long reaction times, colored or impure A–NCA products and of obtaining A–NCA products having a relatively high halogen content.

The reaction involved in the present invention is as follows:

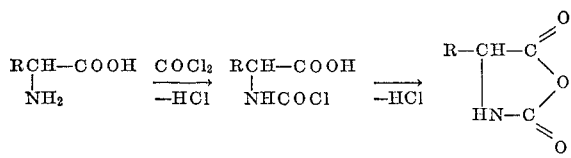

Now describing the present invention more specifically, an amino acid is suspended in an organic phosphoric acid triester or in a solution containing an organic phosphoric acid triester (the content of organic phosphoric acid triester being usually about more than 1% by weight of the amino acid), and phosgene is passed through the reactant mixture at ambient temperature or with heating until the reaction mixture becomes transparent. Alternatively, the starting material is added to a phosgene-containing organic phosphoric acid triester or to a solution of organic phosphoric acid triester in a mixed solvent also containing phosgene, and, thereafter, the reaction solution is heated to the temperature within the range from 50° C. or higher to the refluxing temperature of the reaction solution. Usually, the reaction mixture becomes transparent when an equimolar amount of phosgene has been passed therethrough, although the amount of time required therefor is variable depending upon the rate of introduction of phosgene. Then, any excess amount of phosgene is removed from the reaction solution immediately after the reaction mixture becomes transparent, or removed after the reaction solution has been heated for a suitable time (normally a period of not longer than 30 minutes) to make sure of the completion of the reaction after the reaction mixture becomes transparent, and the reaction solution is concentrated (after removing insoluble substances therefrom by filtration if such are present). In this way, a crude A–NCA product is obtained. The separation of the A–NCA may be facilitated without concentrating the reaction solution by adding a solvent, such as an aliphatic or aromatic hydrocarbon or an ether, which is used as a precipitant for the A–NCA.

It is preferable to maintain the solvent saturated or substantially saturated with phosgene during the reaction. When liquid phosgene is used, it should be added at such a rate that the solvent becomes saturated therewith, because excess phosgene can be removed from the reaction system.

Amino acids used as starting materials in the present invention may be any of the $\alpha$-amino acids, i.e., neutral amino acids, acidic amino acid monoesters, N-substituted derivatives of basic amino acids and derivatives thereof. These amino acids include, for example, glycine, alanine, $\alpha$-aminobutyric acid, valine, norvaline, leucine, isoleucine, norleucine, phenylalanine, tryptophan, O-substituted serine, O-substituted homoserine, O-substituted threonine, O-substituted hydroxyproline, O-substituted tyrosine, S-substituted cysteine, cystine, methionine, aspartic acid-$\beta$-monoester, glutamic acid-$\gamma$-monoester, $\alpha$-amino adipic acid-$\delta$-monoester, im - N - substituted ($N^{im}$-substituted) histidine, proline, $N^\delta$-substituted ornithine and $N^\epsilon$-substituted lysine. In addition, amino acid derivatives which are capable of producing A–NCA upon reaction with phosgene, such as guanido-N-substituted ($N^{guanido}$-substituted) arginine, as well as the salts of the various amino acids can be employed.

The amino acids used may be either optically active or optically inactive, but optically active amino acids are preferably used for producing polyamino acids having a high degree of polymerization.

Organic phosphoric acid triesters having not more than 60 carbon atoms which may be employed in the present invention include not only aliphatic phosphoric acid triesters (including substituted aliphatic phosphoric acid triesters) such as alkyl phosphoric acid triesters [for example, trimethyl phosphate, tri-(dichloromethyl)phosphate, triethyl phosphate, tri - ($\beta$ - ethoxyethyl)phosphate, tri - n - propyl phosphate or the isomers thereof, tri - ($\gamma$ - nitropropyl)phosphate, tri - n - butyl phosphate or the isomers thereof, tri - (1,2 - dichloroethyl)phosphate, triamyl phosphate or the isomers thereof, trihexyl phosphate, etc.], but also aromatic phosphoric acid triesters (including substituted aromatic phosphoric acid triesters) such as, for example, tri-o-tolyl phosphate, tri-m-tolyl phosphate, tribenzyl phosphate, triphenylphosphate, tri - (o - chlorophenyl)phosphate, tri(m-bromophenyl)phosphate, tri-(p-methoxyphenyl)phosphate, etc., and alicyclic phosphoric acid triesters (including substituted alicyclic phosphoric triesters), such as, for example, tricyclopentyl phosphate, tricyclohexyl phosphate, tri-(o-methylcylohexyl)phosphate, tri-(cyclohexylmethyl)phosphate, etc.

The process of the present invention may be carried out at low temperatures or at ambient temperatures, like the conventional processes. However, by heating, the reaction time can be shortened drastically. For instance, by carrying out the reaction at a temperature within the range from about 50° C. or higher to the temperature at which the solvent employed is refluxed, the reaction can be completed quickly.

When the process of the present invention is conducted in an organic phosphoric triester, it is not always necessary to add other solvents thereto, as the organic phosphoric triester used is an extremely effective reaction solvent per se. Of course, it is quite satisfactory to add various liquid compounds, which are not detrimental to the reaction, as a diluent or solvent. Furthermore, by the addition of organic phosphoric acid triesters to the hitherto used solvents, it is possible to improve the yield, purity, halogen content and degree of coloring of the A–NCA obtainable by the use of a single solvent having no organic phosphoric acid triester added thereto. Thus, by the addition of organic phosphoric acid triesters, the character of the reaction solvent can be varied, and a solvent for the synthesis of A–NCA can be obtained which is excellent with respect to reaction time, reaction yield, purity and degree of coloring. For instance, when amino acids are reacted with phosgene in an aliphatic hydrocarbon or an aromatic hydrocarbon at elevated temperatures, the reaction takes a long time and tarry substances are produced as by-products. Accordingly, the crude A-NCA obtained is low in yield and relatively high in the percentage of halogen content. In order to obtain a polymer of high quality and a high degree of polymerization, it is frequently necessary to carry out recrystallization of the crude product several times. However, by having an organic phosphoric acid triester present in the reaction solvent, it is possible to shorten the reaction time markedly, to improve the yield, to minimize the content of halogen, to suppress the formation of tarry substances and thereby to obtain a colorless, highly pure A-NCA.

Any organic solvent (solvents) or diluent (diluents) may be used for the addition of the organic phosphoric triester, provided that it does not substantially interfere with the phosgenation reaction or does not react with the product A-NCA. Preferred are aliphatic, cycloaliphatic or aromatic hydrocarbons having 5 to 21 carbons such as hexane, and isomers thereof, heptane and isomers thereof, octane and isomers thereof, n-nonane and isomers thereof, n-decane, cyclohexane, methylcyclohexane, cycloheptane, cyclooctane, benzene, toluene, xylene (o-, m- and p-), ethylbenzene, mesitylene, cumene, n-propylbenzene, amylbenzene, p-cymene, n-butylbenzene, solvent naphtha, aromatic spirits and the like, diallyl, 1-hexyne, 2-hexyne, tetramethylethylene, hexene, cyclohexene, heptene, 1-heptyne, diisobutylene, $\Delta^3$-, $\Delta^2$ or $\Delta^1$-tetrahydrotoluene, halogenated hydrocarbons having 1 to 6 halogen atoms and having 1 to 15 carbon atoms such as dichloromethane, dichloroethane, trichloroethane, chloroform, tetrachloroethane, dichloroethylene, trichloroethylene, tetrachloroethylene, chlorobenzene, o-, m- or p-chlorotoluene, dibromoethane, bromobenzene, fluorobenzene, o-fluorotoluene, p-fluorotoluene and the like, mononitro-substituted hydrocarbons having 1 to 15 carbon atoms such as nitromethane, nitroethane, 1- or 2-nitropropane, nitrobenzene, o-nitrotoluene and the like, unsubstituted or substituted nitriles (cyanides) having 2 to 15 carbon atoms such as acetonitrile, propionitrile, and isomers thereof, butyronitrile and isomers thereof, valeronitrile and isomers thereof, n-capronitrile and isomers thereof, benzonitrile, acrylonitrile, allylcyanide, methoxyacetonitrile, furonitrile and the like, unsubstituted or substituted ketones having 3 to 20 carbon atoms such as acetone, ethylmethyl ketone, methyl n-propyl ketone, methyl isopropyl ketone, methyl n-butyl ketone, methyl isobutyl ketone, methyl sec-butyl ketone, methyl n-amyl ketone, and isomers thereof, diethyl ketone, di-n-propyl ketone and isomers thereof, di-n-butyl ketone and isomers thereof, di-n-amyl ketone and isomers thereof, dicyclohexyl ketone, cyclopentanone, cyclohexanone, methyl vinyl ketone, biacetyl acetophenone, methyl tolyl ketone, acetyl acetone, chloroacetone $\alpha,\alpha$-dichloroacetone, acetoin, chloromethyl ethyl ketone, mesityl oxide, acetonyl acetone and the like, unsubstituted or substituted esters having 3 to 25 carbon atoms such as ethyl formate, n-propyl formate and isomer thereof, n-butyl formate and isomer thereof, ethyl acetate, n-propyl acetate and isomers thereof, vinyl propionate, n-propyl propionate and isomers thereof, n-butyl propionate and isomers thereof, ethyl $\alpha$-chloroacetate, isopropyl $\alpha$-bromoacetate, ethyl butyrate, n-butyl butyrate, cyclohexyl butyrate, ethyl benzoate, methyl benzoate, allyl formate, methyl carbonate, ethyl carbonate, i-propyl chloroformate, allyl acetate, chloromethyl acetate, methyl orthoformate, ethyl orthoformate, methyl acrylate, ethyl acrylate, methyl i-butyrate, ethyl i-butyrate and the like, and unsubstituted or substituted ethers having 4 to 25 carbon atoms such as ethyl n-propyl ether and isomers thereof, ethyl n-butyl ether and isomers thereof, n-propyl ether, isopropyl ether, isoamyl ether, n-amyl ether, benzyl methyl ether, benzyl ethyl ether, o-, m-, or p-cresyl methyl ether, dioxane, tetrahydrofuran, chloromethyl ether, chloromethyl ethyl ether, allyl ethyl ether, $\alpha$-chloroethyl ether, dichloromethyl ether, $\beta$-chloroethyl ether, $\alpha,\alpha$-dichloroethyl ether, epichlorohydrin, ethylene glycol ethyl ether, ethylene glycol diethyl ether, ethylene glycol monomethyl ether, ethylene glycol dimethyl ether, diethylene glycol dimethyl ether, diethylene glycol diethyl ether and the like, and mixtures of the above-mentioned compounds as inert organic solvents.

The crude A-NCA obtained according to the process of the present invention normally contains not more than 0.05% by weight of chlorine. Accordingly, polymer solutions having a high degree of polymerization can be obtained by carrying out the polymerization in such solvents as dioxane, dichloromethane, chloroform, dichloroethane, ethyl acetate, trichloroethane, tetrachloroethane, dichloroethylene, trichloroethylene and the like, using a polymerization initiator such as an amine base.

The following examples are given merely as illustrative of the present invention and are not to be considered as limiting. Unless otherwise noted, the percentages therein and throughout the application are by weight.

EXAMPLE 1

40 g. of $\gamma$-methyl-L-glutamic acid ester is suspended in 200 ml. of triethyl phosphate, and phosgene is passed through the suspension for 80 minutes at 70° to 80° C. (at such a rate that the moles of phosgene introduced becomes equal to the moles of reactant ester in one hour). After removing excess phosgene from the resultant clear solution by passing nitrogen gas therethrough, the reaction solution is concentrated under reduced pressure and 43.5 g. of crude $\gamma$-methyl-L-glutamic acid-NCA is obtained.

Melting point: 99° to 100° C.
Halogen content: 0.04% (by weight)

EXAMPLE 2

24.5 g. of $\gamma$-methyl-L-glutamate hydrogen chloride is suspended in 50 ml. of triethyl phosphate, to which 200 ml. of triethyl phosphate which has previously absorbed 62 g. of phosgene while being heated at 60° to 80° C. is added with stirring. After the reaction solution becomes clear, it is further heated for 10 minutes and then is concentrated under reduced pressure. 23 g. of crude crystals of $\gamma$-methyl-L-glutamic acid-NCA is obtained.

EXAMPLE 3

40 g. of $\gamma$-methyl-L-glutamic acid ester is suspended in a mixed solvent consisting of 5 ml. of triethyl phosphate and 500 ml. of benzene, and phosgene is passed through the suspension for 90 minutes at 70° to 80° C. (at such a rate that the moles of phosgene introduced becomes equal to the moles of reactant ester in one hour). After removing excess phosgene from the clear reaction solution by passing nitrogen gas therethrough, the reaction solution is cooled to 5° C. and the precipitate is separated by filtering. 43.1 g. of crude $\gamma$-methyl-L-glutamic acid-NCA is obtained. As a control, the process described above is repeated by using only benzene as solvent. A reaction time of 3 hours is required before a clear solution is obtained and the yield of A-NCA was 34.5 g.

EXAMPLE 4

15 g. of $\gamma$-benzyl-L-glutamic acid water is suspended in a mixed solvent consisting of 15 ml. of triethyl phosphate and 300 ml. of benzene and 200 ml. of toluene, and phosgene is passed through the resultant suspension for 60 minutes at 70° to 80° C. After the reaction solution becomes clear, it is further heated and refluxed for 10 minutes and thereafter concentrated under reduced pressure. 14.5 g. of crude $\gamma$-benzyl-L-glutamic acid-NCA is obtained.

Melting point: 96° to 97° C.
Halogen content: 0.04%

EXAMPLE 5

40 g. of finely pulverized $\gamma$-methyl-L-glutamic acid ester is suspended in a mixed solvent consisting of 5 ml. of trimethyl phosphate and 100 ml. of benzene and 300 ml. of chlorobenzene, and phosgene is passed through the suspension for 60 minutes at 75° to 80° C. (at such a rate that the moles of phosgene introduced becomes equal to the moles of starting ester in 60 minutes). After carrying out the reaction further for 30 minutes, the reaction solution is cooled to 10° C. and the resultant precipitate is separated by filtering. 44.0 g. of $\gamma$-methyl-L-glutamic acid-NCA is obtained.

EXAMPLE 6

44 g. of $\gamma$-ethyl-L-glutamic acid ester is suspended in a mixed solvent consisting of 30 ml. of trihexyl phosphate and 800 ml. of o-chlorotoluene, and phosgene is passed through the suspension for 40 minutes at 75° to 80° C. (in an amount 1.5 times the moles of the reactant ester). Thereafter, the reaction solution is treated in the same manner as in the preceding Example 5, and 40.5 g. of $\gamma$-ethyl-L-glutamic acid-NCA is obtained. Then, 100 ml. of petroleum ether is added to the filtrate and after leaving it to stand overnight, 3 g. of crude $\gamma$-ethyl-L-glutamic acid-NCA is recovered. As a control, the above process is repeated without the addition of trihexyl phosphate. The reaction time is 2 hours.

EXAMPLE 7

20 g. of L-alanine is suspended in a mixed solvent consisting of 500 ml. of 1,2-dichloropropane and 10 ml. of tri-o-tolyl phosphate, and phosgene is passed through the suspension for 60 minutes at 70°–80° C. After removing excess phosgene from the resultant transparent solution by passing nitrogen gas therethrough, the reaction solution is concentrated under reduced pressure and 100 ml. of petroleum ether is added thereto. 22.8 g. of crude alanine-NCA is obtained. The melting point is 92° to 93° C. (decomposed) and the halogen content is 0.01%.

EXAMPLE 8

2.8 g. of N$^\epsilon$-carbobenzoxy-L-lysine is suspended in a mixed solvent consisting of 400 ml. of 1,2-dibromopropane and 10 ml. of triethyl phosphate, and phosgene is passed through the suspension for 60 minutes at 85° C. Then, the reaction solution is treated in the same manner as in Example 4. 27.4 g. of N$^\epsilon$-carbobenzoxy-L-lysine-NCA is obtained. The melting point is 98° to 100° C. and the halogen content is 0.05%.

EXAMPLE 9

20 g. of S-carbobenzoxy-L-cysteine is suspended in 100 ml. of tri-n-propyl phosphate and phosgene is passed through the suspension for 30 minutes at 70° to 80° C. (at such a rate that the moles of phosgene introduced becomes equal to the moles of the starting material in 20 minutes). After removing excess phosgene by passing nitrogen therethrough, 50 ml. of petroleum ether and 200 ml. of benzene are added and the resultant mixture is left to stand overnight at 10° C. By filtering the precipitate off, 20.5 g. of S-carbobenzoxy-L-cysteine-NCA is obtained. The melting point is 76° to 78° C. (decomposed) and the halogen content is 0.04%.

EXAMPLE 10

20 g. of β-benzyl-L-aspartic acid ester is suspended in a mixed solvent consisting of 100 ml. of acetonitrile and 10 ml. of trimethyl phosphate, and phosgene is passed through the suspension for 50 minutes under reflux with heating. Then, the reaction solution is treated in the same manner as in Example 9. 19.9 g. of β-benzyl-L-aspartic acid-NCA is obtained. The melting point is 120° to 122° C. and the halogen content is 0.07%.

EXAMPLE 11

The process described in Example 1 is repeated using 40 g. of L-phenylalanine and 42.9 g. of L-phenylalanine-NCA is obtained. The melting point is 95° to 96° C. and the halogen content is 0.05%.

EXAMPLE 12

40 g. of L-leucine is suspended in 100 ml. of tricyclopentyl phosphate and phosgene is passed through the suspension for 60 minutes at 70° to 80° C. (at such a rate that the moles of phosgene introduced becomes equal to the moles of the starting material in 50 minutes). The resultant reaction solution is treated in the same manner as in Example 9, and as a result, 43.5 g. of L-leucine-NCA is obtained. The melting point is 78° to 79° C. and the halogen content is 0.05%.

EXAMPLE 13

The process described in Example 3 is repeated using 40 g. of O-acetylhydroxyproline. 40.5 g. of O-acetylhydroxy-L-proline-NCA is obtained. The melting point is 118° to 120° C. and the halogen content is 0.06%.

EXAMPLE 14

The process described in Example 3 is repeated using 40 g. of O-acetyl-L-tyrosine, and using nitrobenzene in place of benzene. 37 g. of O-acetyl-L-tyrosine-NCA is obtained. The melting point is 121° to 123° C. and the halogen content is 0.05%.

EXAMPLE 15

The process described in Example 2 is repeated using 40 g. of L-tryptophan and 41.5 g. of L-tryptophan-NCA is obtained. The melting point is 132° to 134° C. and the halogen content is 0.04%.

The invention being thus described, it will be obvious that the same may be varied in many ways. Such variations are not to be regarded as a departure from the spirit and scope of the invention, and all such modifications as would be obvious to one skilled in art are intended to be included herein.

We claim:

1. A process for the preparation of an N-carboxy anhydride of an optically active or inactive α-amino acid which comprises reacting said α-amino acid or a salt thereof with phosgene at a temperature of 50° C. to the reflux temperature of the reaction system in the presence of at least one organic triester of phosphoric acid selected from the group consisting of trimethyl phosphate, triethyl phosphate, tri-n-propyl phosphate or the isomers thereof, tri-n-butyl phosphate or the isomers thereof, triamyl phosphate or the isomers thereof, trihexyl phosphate, tri-o-tolyl phosphate, tri-m-tolyl phosphate, tribenzyl phosphate, triphenyl phosphate, tri-(o-chlorophenyl)-phosphate, tri-(m - bromophenyl)phosphate, tri-(p - methoxyphenyl)phosphate, tri-cyclohexyl phosphate, tricyclopentyl phosphate, tri-(o-methylcyclohexyl) phosphate, tri-(cyclohexylmethyl)phosphate, tri - (dichloromethyl)phosphate, tri - (β-ethoxyethyl)phosphate, tri - (γ-nitropropyl)phosphate and tri-(1,2-dichloroethyl)phosphate.

2. A process according to claim 1, wherein said α-amino acid is selected from the group consisting of alanine, leucine, phenylalanine, tryptophan, O-acetylhydroxyproline, O-acetyltyrosine, S-carbobenzoxy cysteine, aspartic acid-β-benzyl ester, γ-methyl glutamate, γ-ethyl glutamate, γ-benzyl glutamate, N$^\epsilon$-carbobenzoxy lysine and salts thereof.

3. A process for the preparation of an N-carboxy anhydride of an optically active or inactive α-amino acid which comprises reacting said α-amino acid or a salt thereof with phosgene at a temperature of 50° C. to the reflux temperature of the reaction system in the presence of a mixed solvent comprising (a) at least 1% by weight, based on the weight of said α-amino acid, of at least one organic triester of phosphoric acid selected from the group consisting of trimethyl phosphate, triethyl phosphate, tri-n-propyl phosphate or the isomers thereof, tri-n-butyl phosphate, or the isomers thereof, triamyl phosphate or the isomers thereof, trihexyl phosphate, tri-o-tolyl phosphate, tri-m-tolyl phosphate, tribenzyl phosphate, triphenyl phosphate, tri-(o-chlorophenyl)phosphate, tri-(m-bromophenyl)phosphate, tri-(o-methoxy-phenyl)phosphate, tri-cyclohexyl phosphate, tri-cyclopentyl phosphate, tri-(o-methylcyclohexyl)phosphate, tri-(cyclohexylmethyl)phosphate, tri-(dichloromethyl)phosphate, tri-(β-ethoxyethyl)phosphate, tri-(γ-nitropropyl)phosphate and tri-(1,2-dichloroethyl)phosphate and (b) at least one inert organic solvent.

4. A process according to claim 3, wherein the said inert organic solvent is selected from the group consisting of hexane and isomers thereof, heptane and isomers thereof, octane and isomers thereof, n-nonane and isomers thereof, n-decane and isomers thereof, diallyl, 1-hexyne, 2-hexyne, tetramethylethylene, hexene, cyclohexene, heptene, 1-heptyne, diisobutylene, Δ$^3$- or Δ$^2$- or Δ$^1$-tetrahydrotoluene, benzene, toluene, xylene (o-, m- and p-), ethyl benzene, amylbenzene, dichloromethane, dichloroethane and isomers thereof, trichloroethane and isomers thereof, chloroform, tetrachloroethane and isomers thereof, dichloroethylene and isomers thereof, trichloroethylene, tetrachloroethylene, 1,1-dibromoethane, chlorobenzene, o-, m- and p-chlorotoluene, bromobenzene, fluorobenzene, o- fluorotoluene, p-fluorotoluene, nitromethane, nitroethane, 1 or 2-nitropropane, nitrobenzene, o-nitrotoluene, acetonitrile, propionitrile and isomers thereof, butyronitrile and isomers thereof, valeronitrile and isomers thereof, n-capronitrile and isomers thereof, benzonitrile, acrylonitrile, allylcyanide, furonitrile, methoxyacetonitrile, acetone, ethyl methyl ketone, methyl n-propyl ketone, methyl isopropyl ketone, methyl n-butyl ketone and isomers thereof, methyl n-amyl ketone and isomers thereof, diethyl ketone, di-n-propyl ketone and isomers thereof, di-n-butyl ketone and isomers thereof, di-n-amyl ketone and isomers thereof, dicyclohexyl ketone, cyclopentanone, cyclohexanone, methyl vinyl ketone, biacetyl, acetophenone, methyl tolyl ketone, acetylacetone, acetoin, chloroacetone, $\alpha,\alpha$-dichloroacetone, chloromethyl ethyl ketone, acetonyl acetone, mesityl oxide, ethyl formate, n-propyl formate and isomers thereof, n-butyl formate and isomers thereof, ethyl acetate, n-propyl acetate and isomers thereof, n-butyl acetate and isomers thereof, ethyl propionate, n-propyl propionate and isomers thereof, n-butyl propionate and isomers thereof, ethyl $\alpha$-chloroacetate, isopropyl $\alpha$-bromoacetate, ethyl butyrate, n-butyl butyrate, cyclohexyl butyrate, allyl formate, methyl carbonate, ethyl carbonate, i-propyl chloroformate, allyl acetate, chloromethyl acetate, methyl orthoformate, ethyl orthoformate, methyl acrylate, ethyl acrylate, methyl i-butyrate, ethyl i-butyrate, ethyl benzoate, methyl benzoate, ethyl n-propyl ether and isomers thereof, ethyl n-butyl ether and isomers thereof, n-propyl ether, isopropyl ether, isoamyl ether, n-amyl ether, benzyl methyl ether, benzyl ethyl ether, o-, m- and p-cresyl methyl ether, dioxane, tetrahydrofuran, chloromethyl ether, allyl ethyl ether, chloromethyl ethyl ether, $\alpha$-chloroethyl ether, dichloromethyl ether, $\beta$-chloroethyl ether, $\alpha,\alpha$-dichloroethyl ether, epichlorohydrin, ethylene glycol ethyl ether, ethylene glycol diethyl ether, ethylene glycol monomethyl ether ethylene, glycol dimethyl ether, diethylene glycol diethyl ether, cyclohexane, methylcyclohexane, cycloheptane, cyclooctane, n-butylbenzene, mesitylene, p-cymene, cumene, n-propylbenzene, solvent naphtha and aromatic spirits.

5. A process according to claim 3, wherein said $\alpha$-amino acid is selected from the group consisting of alanine, leucine, phenylalanine, tryptophan, O-acetylhydroxyproline, O-acetyltyrosine, S-carbobenzoxy cysteine, aspartic acid-$\beta$-benzyl ester, $\gamma$-methyl glutamate, $\gamma$-ethyl glutamate, $\gamma$-benzyl glutamate, $N^\epsilon$-carbobenzoxy lysine and salts thereof.

6. A process according to claim 3, wherein said inert organic solvent is at least one member selected from the group consisting of benzene, toluene, the xylenes, ethylbenzene, and amylbenzenes, dichloromethane, the dichloroethanes, the trichloroethanes, chloroform, the tetrachloroethanes, the dichloroethylenes, trichloroethylene, tetrachloroethylene, dibromoethane, the dichloropropanes, the dibromopropanes, chlorobenzene, the chlorotoluenes, bromobenzene, fluorobenzene, o- and p-fluorotoluene, nitromethane, nitroethane, 1-nitropropane, 2-nitropropane, nitrobenzene, o-nitrotoluene, acetonitrile, the propionitriles, the butyronitriles, the valeronitriles, the n-capronitriles, the benzonitriles, acrylonitriles, allylcyanide, furonitrile, methoxyacetonitrile, n-butylbenzene, mesitylene, the cymenes and n-propylbenzene.

References Cited
UNITED STATES PATENTS 2,993,053    7/1961    Ballard    260—307

ALEX MAZEL, Primary Examiner

R. V. RUSH, Assistant Examiner